United States Patent [19]

Wenger et al.

[11] Patent Number: 5,610,342
[45] Date of Patent: Mar. 11, 1997

[54] METHOD OF FIXING THE MEASURING TUBES OF A MASS FLOW SENSOR

[75] Inventors: Alfred Wenger, Neftenbach, Switzerland; Gerhard Eckert, Rheinfelden; Rainer Lorenz, Lörrach, both of Germany

[73] Assignee: Endress + Hauser Flowtec AG, Reinach, Switzerland

[21] Appl. No.: 434,070

[22] Filed: May 3, 1995

[30] Foreign Application Priority Data

Sep. 19, 1994 [EP] European Pat. Off. .............. 94114725

[51] Int. Cl.⁶ ..................................................... G01F 1/84
[52] U.S. Cl. .................. 73/861.354; 73/861.355
[58] Field of Search ............................ 73/86.37, 861.38, 73/861.35

[56] References Cited

U.S. PATENT DOCUMENTS

| | | |
|---|---|---|
| 3,947,950 | 4/1976 | Adams ...................................... 29/523 |
| 4,090,382 | 5/1978 | Schott . |
| 4,127,028 | 11/1978 | Cox et al. . |
| 4,768,384 | 9/1988 | Flecken et al. . |
| 4,793,191 | 12/1988 | Flecken et al. . |
| 5,048,351 | 9/1991 | Dames ................................. 73/861.38 |
| 5,095,761 | 3/1992 | Nortz et al. . |
| 5,230,254 | 7/1993 | Craft .................................... 73/861.38 |
| 5,344,717 | 9/1994 | Dutton, Jr. et al. ................. 73/861.38 |

FOREIGN PATENT DOCUMENTS 3724675  2/1989  Germany .
WO87/06691  11/1987  WIPO .

*Primary Examiner*—Richard Chilcot
*Assistant Examiner*—Max H. Noori
*Attorney, Agent, or Firm*—Bose McKinney & Evans

[57] ABSTRACT

This method of fixing the ends of measuring tubes in associated transition pieces of a Coriolis-type mass flow sensor eliminates the risk of stress-corrosion cracking in these areas as completely as possible. The ends of the measuring tubes are inserted into associated bores of the respective transition pieces and are press-bonded to the walls of the respective bores without heat supply using a rolling tool which is inserted into the respective ends.

6 Claims, 1 Drawing Sheet

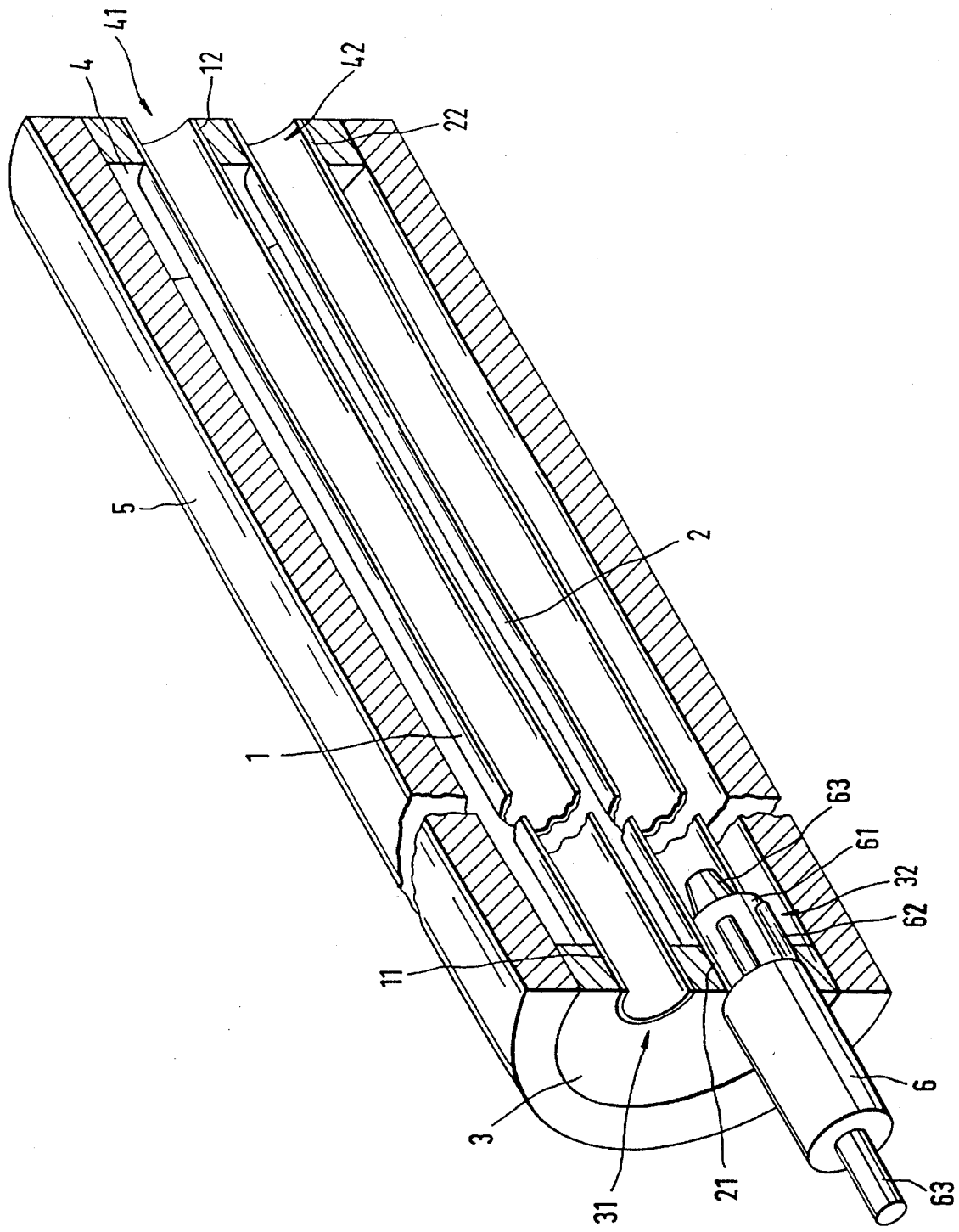

METHOD OF FIXING THE MEASURING TUBES OF A MASS FLOW SENSOR

FIELD OF THE INVENTION

The present invention relates to the fixing of the ends of at least one measuring tube of a Coriolis-type mass flow sensor in bores of an inlet-side transition piece and an outlet-side transition piece, respectively.

BACKGROUND OF THE INVENTION

Mass flow sensors basically use only two tube shapes, namely, on the one hand, straight measuring tubes and, on the other hand, arbitrarily bent or even twisted measuring-tube loops, among which the U-shaped loops are the preferred tube shapes. For reasons of symmetry, two straight measuring tubes extending parallel to each other in two parallel planes in a state of rest, or corresponding tube loops, are generally used.

Regarding one of the two variants, namely the one using two parallel straight tubes, reference is made, by way of example, to applicant's U.S. Pat. Nos. 4,768,384 and 4,793,191. The other variant, using two parallel U-shaped tube loops, is disclosed, for example, in U.S. Pat. No. 4,127,028.

WO-A-87/06691 discloses a Coriolis-type mass flow sensor in which the ends of at least one measuring tube are inserted in bores of inlet-side and outlet-side transition pieces, respectively, and fixed therein by welding, soldering, or brazing at the front and rear sides, cf. the material bulges that are visibile in some of the figures. The transition pieces are fixed in an external support.

SUMMARY OF THE INVENTION

As investigations have shown, the heat supply required during the aforementioned welding, soldering, or brazing operation at the points where the measuring tubes are fixed to the transition pieces results, after cooling, in a stress state which may lead to stress-corrosion cracking, particularly if fluids are to be measured which attack the measuring-tube material.

The invention aims to solve this problem by providing another method of fixing the measuring tubes in the transition pieces which eliminates the risk of stress-corrosion cracking as completely as possible.

Accordingly, the invention provides a method of fixing the ends of at least one measuring tube of a Coriolis-type mass flow sensor in bores of an inlet-side transition piece and an outlet-side transition piece, respectively, which, in turn, are fixed in an external support, each end of the measuring tube being inserted into the associated bore and being press-bonded to the wall of the respective bore without heat supply using a rolling tool which is inserted into the respective end.

According to an advantageous development of the invention, if at least two measuring tubes are used, the respective ends are press-bonded in the respective transition pieces only until the measuring tubes are dynamically optimally balanced.

In a preferred embodiment of this development, to determine the optimum dynamic balance, an acceleration sensor is disposed on the external support, and the respective measuring tube and the respective transition piece are press-bonded until the signal of the acceleration sensor has a minimum.

A rolling tool as is used in the method of the invention is described in U.S. Pat. No. 4,090,382 for the attachment of boiler or heat-exchanger tubes.

BRIEF DESCRIPTION OF THE DRAWING

The invention will now be explained in more detail with reference to the accompanying drawing, whose single figure is a perspective, partly sectioned schematic view of that portion of one embodiment of a mass flow sensor with two parallel, straight measuring tubes which is essential for the method of the invention.

DETAILED DESCRIPTION OF THE DRAWING

The figure of the drawing shows those parts of mass flow sensors which are essential for the invention. The other functional parts are not shown to simplify the illustration; with respect to the latter parts, reference is made to the aforementioned prior art documents.

A first straight measuring tube 1 with an inlet-side end 11 and an outlet-side end 12 and a second straight measuring tube 2 with an inlet-side end 21 and an outlet-side end 22 are positioned within corresponding bores 31, 32 of an inlet-side transition piece 3 and within corresponding bores 41, 42 of an outlet-side transition piece 4. The two transition pieces 3, 4 are, in turn, fixed in a support, e.g., a rigid support tube 5.

In operation, the measuring tubes 1, 2 are installed in a conduit carrying a fluid to be measured, such as a liquid or a gas. Connections may be made by means of flanges, screws, etc. Thus, the fluid to be measured also flows through the measuring tubes 1, 2.

In the embodiment, the measuring tubes 1, 2 extend parallel to each other. A vibration exciter (not shown) sets the measuring tubes 1, 2 into oppositely directed resonance vibrations in the plane containing the axes of the tubes.

Two detectors (not shown) for picking up those vibrations are spaced along the measuring tubes. The mass rate of flow of the fluid can be determined from the phase difference of the detector signals in a conventional manner, and/or the density of the fluid can be determined from the vibration frequency of the measuring tubes.

After the measuring tubes 1, 2 have been positioned within the transition pieces 3, 4, a rolling tool 6 is inserted into the lumen of the end of the respective measuring tube 1, 2. At its front end (as seen in the direction of insertion), the rolling tool 6 carries a cage 61 with rollers 62 distributed around its circumference and rotatably mounted within corresponding openings.

The circle along which the rollers 62 move during rotation of the rolling tool 6 has a radius which can be adjusted by means of a member 63 that is movable in the direction of insertion. By increasing this radius as compared with the radius with which the rolling tool 6 is first inserted into the lumina of the measuring tubes 1, 2, the ends of these tubes can be pressed against the walls of the bores 31, 41, and 32, 42, respectively.

In this manner, the ends 11, 12 and 21, 22 of the measuring tubes 1, 2 are press-bonded, without heat supply, to the walls of the bores 31, 41 and 32, 42, respectively. This results in a slight plastic flow of the material of the measuring tubes 1, 2, and thus in a very firm mechanical joint in these areas.

Furthermore, the wall thickness at the ends of the measuring tubes 1, 2 becomes slightly thinner, which results in compressive stress in the longitudinal direction of the respective measuring tube, henceforth called "axial stress", since the measuring tubes would become slightly longer if they were not clamped in the support tube. Within the respective bores 31, 41 and 32, 42, compressive stress is exerted in the radial direction, henceforth called "radial stress".

The radial stress is due to the fact that during the pressure bonding, the end portions 11, 12, 21, 22 of the measuring tubes 1, 2 are plastically deformed, while the transition pieces 3, 4, because of their greater thickness in comparison with the end portions, are deformed essentially elastically, so that after the press bonding, the transition pieces exert a radial force toward the center of the end portions.

The radial stress is the primary reason why stress-corrosion cracking, which invariably occurs in prior art mass flow sensors because the ends of their measuring tubes are soft-soldered or brazed or welded into the inlet-side and outlet-side transition pieces, can be virtually avoided. The axial stress also contributes to this avoidance, but to a much smaller extent.

The inventors were surprised to find that the press bonding described, which was hitherto used only with nonmoving, particularly nonvibrating, tubes, namely with boiler or heat-exchanger tubes, can be used particularly successfully with measuring tubes of mass flow sensors, which vibrate in operation, and that the above disadvantages of the soldering, brazing or welding operation can thus be avoided.

In mass flow sensors with at least two measuring tubes, the press bonding can also be used with advantage to achieve an optimum dynamic balance of the measuring tubes. This will now be illustrated by the example of a mass flow sensor with two straight measuring tubes which are surrounded by a support tube of the kind mentioned above, see the figure.

First the transition pieces 3, 4 are fixed in the support tube 5; the support tube and the transition pieces may also be of one-piece construction. Then, the ends 12, 22 of the measuring tubes 1, 2 are positioned within the associated bores 41, 42 of the transition piece 4 and are pre-press-bonded to the bore walls over the entire length of the bores by rotating the rolling tool 6 therein; "pre-press-bonded" means that the full pressing pressure is not applied yet.

Next, the ends 11, 21 of the measuring tubes 1, 2 are positioned within the associated bores 31, 32 of the transition piece 3. By means of the rolling tool 6, the end 11 of one of the measuring tubes, 1, is press-bonded to the wall of the bore 31 over the entire length of the bore with the full pressing pressure.

Thereafter, the end 21 of the other measuring tube 2 is press-bonded by means of the rolling tool 6 only until the measuring tubes are dynamically optimally balanced, i.e., the member 63 of the rolling tool 6 is moved and simultaneously rotated until balance is achieved.

Finally, the pre-press-bonded end 12 of the measuring tube 1 is press-bonded to the wall of the bore 41 of the transition piece 4 with the full pressing pressure. Then, the pre-press-bonded end 22 of the measuring tube 2 is press-bonded by means of the rolling tool 6 until the measuring tubes 1, 2 are dynamically optimally balanced.

To determine the optimum dynamic balance, an acceleration sensor is disposed on the support 5. The press bonding is performed only until the signal of this sensor has a minimum.

If the ends of the respective bores and the ends of the respective measuring tubes are to be aligned after the press bonding, the corresponding surface of the transition piece—this is the front surface which can be seen in the figure of the drawing—can be covered with a device serving as a stop, or the respective measuring tube will be inserted not quite up to the end of the bore.

We claim:

1. A method of fixing ends of two measuring tubes of a Coriolis-type mass flow sensor in bores formed in a first transition piece and in bores formed in a second transition piece and dynamically balancing the two measuring tubes, where the bores define walls having lengths, the method comprising the steps of:

inserting first ends of the two measuring tubes into the bores in the first transition piece;

press-bonding the first ends of the two measuring tubes to the walls defined by the bores in the first transition piece;

inserting second ends of the two measuring tubes into the bores in the second transition piece;

press-bonding the second end of one of the two measuring tubes to the wall defined by one of the bores in the second transition piece; and dynamically balancing the two measuring tubes by generating a balancing signal representing the dynamic balance of the two measuring tubes and press-bonding the second end of the other of the two measuring tubes to the wall defined by the other bore in the second transition piece until the balancing signal indicates that optimum dynamic balance is achieved.

2. The method of claim 1, wherein the step of press-bonding the first ends of the two measuring tubes to the first transition piece includes the steps of providing a rolling tool, inserting the rolling tool into the first ends of the measuring tubes, and rotating the rolling tool within the first ends of the measuring tubes with full pressing pressure so that the first ends of the measuring tubes are enlarged to engage the entire lengths of the walls defined by the bores of the first transition piece.

3. The method of claim 1, wherein the step of press-bonding the second ends of the measuring tubes to the second transition piece includes the steps of providing a rolling tool, inserting the rolling tool into the second ends of the measuring tubes, and rotating the rolling tool within the second ends of the measuring tubes with full pressing pressure so that the second ends of the measuring tubes are enlarged to engage the entire lengths of the walls defined by the bores of the second transition piece.

4. The method of claim 1, further comprising the step of providing an acceleration sensor to generate the balancing signal and to measure the dynamic balance of the measuring tubes.

5. The method of claim 1, wherein the step of press-bonding the first ends of the measuring ends to the bores of the first transition piece includes the step of pre-press-bonding the first ends of the measuring tubes to the bores of the first transition piece before the second ends are press-bonded to the second transition piece.

6. The method of claim 5 further comprising the step of press-bonding the first ends of the measuring tubes to the bores in the first transition piece until the balancing signal indicates that optimum dynamic balance is achieved after the second ends of the measuring tubes are press-bonded to the second transition piece.

* * * * *